2,870,064
PENICILLIN PROCESS

Eli Seifter and George A. Richardson, Dayton, Ohio, assignors to Monsanto Chemical Company, St. Louis, Mo., a corporation of Delaware No Drawing. Application July 25, 1956
Serial No. 599,929

3 Claims. (Cl. 195—36)

The present invention is directed to a novel method of preparing valuable penicillins which involves growing a penicillin producing mold in a nutrient medium containing an N,N'-diacylcystamine.

The procedures for producing penicillin by fermentation in a nutrient medium are well known. The process of the present invention comprises the incorporation of a N,N'-diacylcystamine as a precursor in the nutrient medium, and then conducting the fermentation and separating the penicillin product according to well-established procedures.

Penicillins can be represented by the formula:

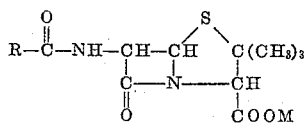

in which R is an organic radical and M is a salt-forming radical or hydrogen. The present commercial methods of forming penicillins are not entirely satisfactory, as they usually result in mixtures of penicillins, and the desired penicillin frequently constitutes a very small percentage of the penicillin product.

It has now been found that N,N'-diacylcystamines are useful as penicillin precursors and in directing the course of the penicillin fermentation process. These N,N'-diacylcystamines can be represented by the formula:

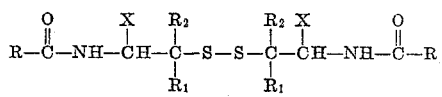

in which R is an organic radical, $R_1$ and $R_2$ are hydrogen or alkyl groups, particularly lower alkyl groups containing 1 to 6 carbon atoms, and X is hydrogen, a carboxyl group or an alkyl group, particularly a lower alkyl group. The cystamine moiety ordinarily contains no elements other than carbon, hydrogen, oxygen, sulfur and nitrogen, and ordinarily contains no unsaturation other than that in carboxyl substituents, i. e., the carbon to oxygen double bond. In the acyl moiety, the R can, for example, be aliphatic or aromatic, as in alkoxy, aryloxy, alkyl, aryl, alkaryl, aralkyl, alkoxyalkyl, aryloxyalkyl, etc. A few examples of such radicals which can be used are benzyl, p-methylbenzyl, p-nitrobenzyl, benzyloxy, ethyl, butyl, hexyl, cyclohexyl, β-ethoxyethyl, etc.

Compounds which are especially valuable in the process of the present invention are N,N'-bis(oxyacetyl)cystamines. When these compounds are included in the penicillin nutrient medium, it appears that the N-(β-thioethyl)α-oxyacetamide moiety is incorporated bodily into the penicillin molecule as represented below:

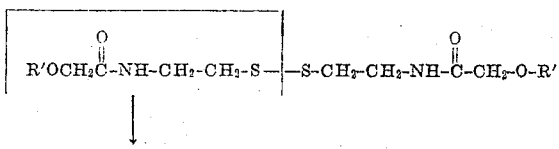

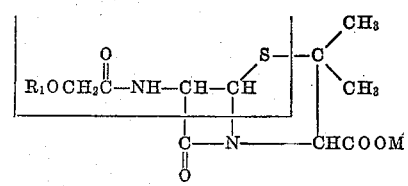

In the above formulae, R' represents an organic radical, e. g., an aryl radical or an aliphatic hydrocarbon radical. The N,N'-bis(oxyacetyl)cystamines are preferred not only because they are very efficient in directing the course of the penicillin reaction, possibly by providing a skeleton therefor, but also because the oxy-penicillins toward which the reaction is directed, are an especially valuable group of penicillins. The phenoxy penicillins are particularly valuable.

R' in the above formulae can be an aryl radical, such as, for example, phenyl, p-tolyl, m-chlorophenyl, p-ethylphenyl, p-isopropylphenyl, p-butylphenyl, p-nitrophenyl, and various other mono-substituted phenyl radicals. Among the aliphatic radicals which are represented by R' are, for example, aliphatic hydrocarbon radicals containing 2 to 6 carbon atoms, such as ethyl, allyl, butyl, isoamyl, buten-1-yl, n-hexyl, etc.

A few examples of useful bis(oxyacetyl)cystamine compounds containing the above radicals are: N,N'-bis-(phenoxyacetyl)cystamine, N,N'-bis(phenoxyacetyl)cystine, N,N'-bis(p-ethylphenoxyacetyl)cystamine, N,N'-bis(p-isopropylphenoxyacetyl)cystine, N,N'-bis(p-butylphenoxyacetyl)cystamine, N,N'-bis(allyloxyacetyl)cystamine, bis(N-phenoxyacetyl-β-valine)disulfide, and various other oxyacetylcystamines and oxyacetyl derivatives of the disulfides formed from β-mercapto-α-amino acids.

The use of the above N,N'-bis(oxyacetyl)cystamines as precursors will give the corresponding oxy-penicillins, e. g., a phenoxy-penicillin will have substituents on the phenoxy group corresponding to those in the phenoxy precursor compound.

The valuable precursors which we have discovered can be utilized in ordinary penicillin fermentation procedures. In general, a selected precursor compound is incorporated in a nutrient medium with a penicillin producing mold, and fermentation is allowed to occur. As nutrient medium, any of the sources of assimilable carbon and degraded proteinaceous material known to the art can be used. Suitable sources of assimilable carbon are carbohydrates, particularly carbohydrates of the class known as polysaccharides, which comprises those carbohydrates containing more than one monosaccharide unit per molecule, such as lactose, starch, raffinose, melibiose, sucrose, inulin, dextrins, molasses, maltose or cereal grain mashes. It is desirable, but not essential, that the starch be present in such concentration and in such a state of modification that the nutrient medium is fluid at the time of inoculation. Potato starch, corn starch, wheat starch, tapioca starch and rice starch are suitable. Sucrose can be used in the form of purified sugar, or as cane or beet molasses. Grain mashes, such as corn, wheat or barley mashes can be used. Some of the grain mashes are sufficiently rich in protein that extra proteinaceous adjuncts need not be added to the medium. Sugar alcohols, e. g., glycerol, sorbitol, mannitol, erythritol, etc. are also excellent carbon sources. Simple sugars, e. g., glucose, can also be used as a carbon source.

A wide variety of proteinaceous materials can be used in our process, e. g., corn-steeping liquor, wheat-steeping liquor, acid-hydrolyzed casein, enzyme-hydrolyzed casein, whey or whey concentrate, soybean meal, distiller's grain slops, and mixtures of various amino acids. The use of corn-steeping liquor is especially advantageous, since it is a cheap, readily available product of the cornwet milling industry. Since the ash of corn-steeping liquor consists principally of potassium magnesium phosphate and sulfate, the use of this liquor as a constituent of the nutrient medium makes unnecessary the addition of potassium phosphate and magnesium sulfate. Suitable amounts of nutrient materials are, for example, from 5 to 100 grams of a source of assimilable carbon and from 5 to 100 grams of a degraded proteinaceous material per liter of medium.

The molds suitable for the process of the present invention are mold organisms of the type capable of producing penicillin. Such organisms include molds of the *Penicillium notatum chrysogenum* group as well as certain molds of the *Aspergillus* group. Of course, not all molds are equally efficient in the process of the present invention. Some examples of mold strains which can be used in the process of the present invention are strains X1612 and Q176 of the *Penicillium notatum chrysogenum* group, strain G147 of the *Aspergillus flavus* group, *Penicillium notatum* Westling NRRL 832, *Peniccilium chrysogenum* Thom NRRL 815, etc.

The concentration of the precursor compounds in the culture medium can vary to some extent. The precursor can be present in concentrations of the order of 1%, although it is usually desirable that the precursor be present in smaller concentrations, since there is no particular advantage in employing concentrations substantially greater than those required to produce the optimum effect. For example, on the basis of grams of precursor per milliliter of culture medium, concentrations of 0.01 to 0.05 or 0.1% are suitable.

The mold may be grown under various conditions. For example, if the mold is grown without agitation of the culture medium, it grows on the surface of the medium; if agitation is used, the mold grows throughout the medium. The mold is grown under aerobic conditions, i. e., in the presence of oxygen or air, usually with the aid of aeration or agitation. The incubation temperatures suitable for mold growth and the production of penicillin vary considerably; for example, from 20 to 30° C.; however, temperatures of the order of 23 to 26° C. are usually preferred. The mold growth is permitted to continue for a suitable time, e. g., two to five or six days.

It will be understood that the examples herein are illustrative rather than limitative.

*Example 1*

The sodium salt of phenoxy-penicillin (Penicillin V) can be prepared according to the following procedure.

A culture medium containing the following ingredients is prepared:

| | |
|---|---:|
| Lactose _____grams__ | 125 |
| Corn steep solids_____do____ | 150 |
| Calcium carbonate_____do____ | 25 |
| N,N'-Bis(phenoxyacetyl)-cystamine _____do____ | 1 |
| Water _____ml__ | 5000 |

The bis-(N-phenoxyacetyl)cystamine is preferably dissolved in about 2 to 3 cc. of ethanol, prior to incorporation in the culture medium.

The culture medium is distributed in 200 cc. portions in 1 liter Erlenmeyer flasks, sterilzed, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and shaken with an equal volume of amyl acetate. The amyl acetate layer is separated and extracted with three successive 100 cc. portions of cold water to which cold N/10 sodium bicarbonate solution is added during the course of each extraction until a pH of about 7.0 to 7.3 is attained in the aqueous phase. The aqueous extracts are combined, cooled to about 0° C., acidified to about pH 2.2 with orthophosphoric acid and extracted successively with three 100 cc. portions of ether. The ether extracts are combined, and are passed through a chromatographic type silica adsorption column about 30 mm. in diameter and 250 mm. long and containing a pH 6.2 phosphate buffer. The silica column is developed by percolation with six 100 cc. portions of ether containing successively increasing amounts of methanol in the order of ½, 1, 1½, 2, 2½ and 3 percent.

The developed silica column is divided into about 12 equal sections and each section is eluted with three 30 cc. portions of M/15 phosphate buffer of pH 7.0. The eluates are assayed bacteriologically to determine their penicillin content. Most of the antibiotic activity is found in certain of the sections, and the eluates from these sections are combined, cooled to about 0° C. and acidified to about pH 2.2 and extracted with three 50 cc. portions of chloroform. The combined chloroform extracts are passed through a silica adsorption column containing a pH 6.2 phosphate buffer. This silica column is developed by percolation with three 150 cc. portions of chloroform containing successively increasing amounts of methanol in the order to 1, 2, and 3 percent. The developed silica column is then divided into 12 equal sections and each section is eluted with three 30 cc. portions of M/15 phosphate buffer of pH 7.0. Again most of the antibiotic activity originates in certain of the sections of the column, and the eluates from these sections are combined, cooled to about 0° C., acidified to about pH 2.2 and extracted with three 100 cc. portions of ether. The ether extracts are combined and extracted with about 75 cc. of a cold, dilute aqueous solution of sodium hydroxide to which N/10 sodium hydroxide is added during the course of the extraction so that a final pH of about 7.0 is attained in the aqueous phase. From the aqueous solution, the sodium salt of phenoxy-penicillin may be prepared by any suitable means, for example by freezing and evaporation in vacuo from the frozen state.

The sodium salt which is so obtained is purified by dissolving it in several cc. of absolute acetone, from which it separates in crystalline form upon standing. After centrifugation and washing with absolute acetone, it can be further purified by dissolving it in a small amount of aqueous acetone, filtering, and adding a small amount of absolute acetone to cause the pure crystalline material to separate.

Analysis of penicillins produced by the use of N,N'-bis(phenoxyacetyl)cystamine as a precursor indicated the following percentages of various penicillins.

| Penicillin: | Percent |
|---|---:|
| X _____ | 2.7 |
| G _____ | 4.5 |
| V _____ | 58.5 |
| dihydro-F _____ | 17.1 |
| K _____ | 17.2 |

Penicillin V is the desired phenoxy-penicillin. It can readily be seen from the results above that the use of N,N'-bis(phenoxyacetyl)cystamine in the penicillin process results in a product containing a high percentage of the valuable phenoxy-penicillin.

The other penicillins above are known varieties, e. g., if the penicillins are represented by the formula $$RC_9H_{10}N_2O_4SNa$$

R is equal to p-hydroxybenzyl in penicillin X, to benzyl in the common penicillin G, to pentyl in penicillin dihydro-F, and to heptyl in penicillin K.

Penicillin V is particularly valuable as it is an antibiotic compound which is effective when administered orally.

The N,N'-bis(phenoxyacetyl)cystamine used above was prepared according to the procedure of the following example.

Example 2

To 20 grams of β-mercaptoethylamine in 300 ml. water, 30% hydrogen peroxide was added until the nitroprusside test (for free —SH) was negative indicating complete oxidation to the disulfide. The solution was cooled in an ice water bath and made alkaline with sodium hydroxide. Phenoxyacetyl chloride, 53.3 grams, was added dropwise while the pH of the solution was kept above 9 by the addition of sodium hydroxide as necessary. After the addition of phenoxyacetyl chloride was completed, the solution was stirred for 20 minutes, and the white solid precipitate was separated by filtration, and washed many times with water. The product was dissolved in 400 ml. of ethanol (2B) and allowed to crystallize slowly. The N,N'-bis(phenoxyacetyl)cystamine, M. P. 110.5–112.5° C., was produced in an amount of 40 grams for a yield of 72.8% of theory based upon the β-mercaptoethylamine.

Instead of oxidizing with hydrogen peroxide as above, oxidation can be accomplished with oxygen, or by aeration, or by any other procedure suitable for oxidizing sulfhydryl compounds to disulfides. In addition, the oxidation could take place at a different stage of the procedure, e. g., if N-(β-mercaptoethyl)-α-phenoxyacetamide were available, it could be oxidized to N,N'-bis(phenoxyacetyl)cystamine. Moreover, the N,N'-bis(phenoxyacetyl)cystamine does not have to be isolated and purified as in the above procedure, but can be used directly as prepared.

Example 3

In a penicillin fermentation procedure similar to that of Example 1, a small amount of N,N'-bis(phenylacetyl)cystine is included in the culture medium. Upon working up the product by the procedure of Example 1, a penicillin product of the following composition is obtained:

| Penicillin: | Percent |
|---|---|
| X | 4.2 |
| G | 13.2 |
| F | 12.0 |
| Dihydro-F | 33.5 |
| K | 37.1 |

The phenylacetyl compound would be expected to aid in the production of penicillin G. No penicillin V was detected in the product.

Example 4

In a procedure similar to that of Example 1, bis-(β-phenylacetylaminoethyl)disulfide is used as a precursor. The resulting penicillin product has the following composition:

| Penicillin: | Percent |
|---|---|
| X | 3.5 |
| G | 8.0 |
| F | 12.0 |
| Dihydro-F | 30.7 |
| K | 45.8 |

Example 5

Allyloxy-penicillin can be produced in substantial yield by using N,N'-bis(allyloxyacetyl)cystine as a precursor in a fermentation process according to the procedure of Example 1.

N,N-bis(butoxyacetyl)cystine can similarly be used to prepare butoxy-penicillin.

The N,N'-diacylcystamines and N,N'-diacylcystines for use in this invention are prepared according to Example 2 above. For example, the precursor used in Examples 3 to 5 can be prepared by treating the corresponding β-mercaptoethylamines and the corresponding oxyacetyl chlorides according to the procedure of Example 2. Of course, cystine is available as such, and need only be reacted with the desired oxyacetyl chloride in the manner of Example 2, as illustrated below.

Example 6

To 24 grams of cystine dissolved in 200 ml. of 1 N sodium hydroxide and cooled by an ice bath was added in small portions 30.9 grams of phenacetyl chloride. The mixture was kept alkaline to phenolphthalein by occasional addition of 1 N alkali. The mixture was allowed to stir for twenty minutes at room temperature following the addition of the phenacetyl chloride. The solution was acidified (to pH 2) with dilute acid whereupon a gummy substance settled to the bottom of the solution. The gum soon started to crystallize. The semi-gummy solid was separated from the acid medium and dissolved in a large volume of acetone, heated to boiling and filtered. The filtrate was diluted with acetone, cooled, and filtered. The acetone was removed from the filtrate by heating under vacuum (up to 50° C.) whereupon a crystalline substance resulted. The solids were recrystallized from water-alcohol to give 34.2 grams of thin white needles, M. P. 120–121° C., for 74.2% of the theoretical yield.

The mechanism by which the N,N'-diacylcystamines aid the production of penicillins is not certain. It may be that the N,N'-diacylcystamines are broken down into N-(β-mercaptoethyl) acid amide compounds by the penicillin mold prior to formation of the penicillin. Nevertheless, it is preferred to incorporate the N,N'-diacylcystamines as such into the nutrient medium, as these compounds are readily prepared and stable, are not too reactive and not too likely to undergo side reactions with other ingredients of the nutrient medium, can readily be incorporated in the nutrient medium, and give good results.

In addition to the processes specifically disclosed herein, the present invention contemplates the use of N,N'-diacylcystamines in any of the known fermentation procedures for producing penicillins. Such procedures are taught, for example, in Patents No. 2,476,107 and No. 2,443,989 to Andrew J. Moyer, and Patent No. 2,445,748 to Milislav Demerec, and N,N'-diacylcystamines can be usefully included in any of the procedures taught in these patents.

An improved procedure for the production of penicillins, involving the use of N,N'-diacylcystamines as precursors for penicillin has been described. An especially preferred procedure involving the use of N,N'-bis(oxyacetyl)cystamines has been taught.

We claim:

1. A method for the production of penicillins which comprises adding a penicillin producing mold and an N,N'-bis(oxyacetyl)-β,β'-diaminodiethyl disulfide to an aqueous nutrient medium, maintaining the resulting inoculated medium at 23 to 26° C. under aerobic conditions for at least 2 days, and recovering resulting oxypenicillins from the medium.

2. A method of preparing aryloxy penicillins which comprises adding a mold of the *Penicillium notatum chrysogenum* group and N,N'-bis(aryloxyacetyl)-β,β'-diaminodiethyl disulfide to an aqueous nutrient medium containing lactose and corn steep solids, maintaining the temperature of the resulting inoculated medium at 23 to 26° C. for five days, and recovering resulting aryloxy-penicillins from the nutrient medium.

3. The method of claim 2 in which the said disulfide is N,N'-bis(phenoxyacetyl)-β,β'-diaminodiethyl disulfide.

(References on following page)

References Cited in the file of this patent

UNITED STATES PATENTS 2,479,295  Behrens et al. ———————— Aug. 16, 1949
2,562,410  Behrens et al. ———————— July 31, 1951

OTHER REFERENCES

"Concise Chemical and Tech. Dictionary," 1947, by G. Bennett, published by Chem. Publ. Co., Inc. (New York), pages 273 and 465.

"The Chemistry of Penicillin," 1949, by Clarke et al., published by Princeton University Press (Princeton, N. J.), pages 658 to 644 and 666.

"J. Org. Chem.," Wood et al., vol. 17 (1952), pages 891 to 896.